(12) United States Patent
Seliskar et al.

(10) Patent No.: US 8,912,271 B2
(45) Date of Patent: Dec. 16, 2014

(54) SOUND-DEADENING FILLED THERMOPLASTIC POLYOLEFIN COMPOSITION

(75) Inventors: James T. Seliskar, Bay City, MI (US); James D. Oelberg, Saginaw, MI (US); Tariq S. Oweimreen, Sterling Heights, MI (US); Paul M. Sowers, Commerce, MI (US); Thomas Karcz, Dortmund (DE)

(73) Assignee: Dow Global Technologies LLC, Midland, MI (US)

( * ) Notice: Subject to any disclaimer, the term of this patent is extended or adjusted under 35 U.S.C. 154(b) by 12 days.

(21) Appl. No.: 13/825,339

(22) PCT Filed: Nov. 19, 2010

(86) PCT No.: PCT/US2010/057320
§ 371 (c)(1),
(2), (4) Date: Mar. 21, 2013

(87) PCT Pub. No.: WO2012/039733
PCT Pub. Date: Mar. 29, 2012

(65) Prior Publication Data
US 2013/0187076 A1    Jul. 25, 2013

Related U.S. Application Data

(60) Provisional application No. 61/385,176, filed on Sep. 22, 2010.

(51) Int. Cl.
| | | |
|---|---|---|
| C08L 23/08 | (2006.01) | |
| C08L 23/14 | (2006.01) | |
| C08L 91/00 | (2006.01) | |
| C08K 3/30 | (2006.01) | |
| C08K 5/00 | (2006.01) | |
| C08K 3/26 | (2006.01) | |
| C08K 3/00 | (2006.01) | |

(52) U.S. Cl.
CPC .......... *C08L 23/0815* (2013.01); *C08K 3/0033* (2013.01); *C08L 23/14* (2013.01); *C08L 91/00* (2013.01); *C08K 5/0016* (2013.01); *C08K 2003/265* (2013.01); *C08K 2003/3045* (2013.01)
USPC ............................................. 524/515; 252/62

(58) Field of Classification Search
CPC ...... C08L 23/0815; C08L 23/14; C08L 91/00; C08L 2666/02; C08K 2003/3045; C08K 5/0016; C08K 2003/265; C08K 3/0033
USPC ..................... 524/423, 515; 252/62
See application file for complete search history.

(56) References Cited

U.S. PATENT DOCUMENTS

| | | |
|---|---|---|
| 4,191,798 A | 3/1980 | Schumacher et al. |
| 4,222,924 A | 9/1980 | Schumacher |
| 4,263,196 A | 4/1981 | Schumacher et al. |
| 4,379,190 A | 4/1983 | Schenck |
| 4,403,007 A | 9/1983 | Coughlin |
| 4,430,468 A | 2/1984 | Schumacher |
| 4,434,258 A | 2/1984 | Schumacher et al. |
| 4,438,228 A | 3/1984 | Schenck |
| 6,472,042 B1 | 10/2002 | Dibbern et al. |
| 6,787,593 B2 | 9/2004 | Bell et al. |
| 7,741,398 B2 * | 6/2010 | Heck .............................. 524/451 |

OTHER PUBLICATIONS

Data Sheet for Dowlex 2045, no date.*

* cited by examiner

*Primary Examiner* — Angela C Scott

(57) ABSTRACT

The present invention relates to filled thermoplastic polyolefin compositions useful e.g., as sound-deadening sheeting for formed automotive applications comprising a propylene polymer having a density equal to or greater than 0.885 $g/cm^3$, one or more linear ethylene polymer and/or substantially linear polymer, a plasticizer, and a filler, preferably calcium carbonate. Said composition demonstrates a good balance of heat properties and stiffness such that it is particularly suitable for sheet extrusion and thermoforming articles therefrom.

8 Claims, No Drawings

SOUND-DEADENING FILLED THERMOPLASTIC POLYOLEFIN COMPOSITION

CROSS REFERENCE STATEMENT

This application claims the benefit of U.S. Provisional Application No. 61/385,176, filed Sep. 22, 2010, which is incorporated herein by reference.

FIELD OF THE INVENTION

This invention relates to sound-deadening composites comprising a propylene polymer having a density equal to or greater than 0.885 grams per cubic centimeter, a linear ethylene polymer and/or substantially linear polymer, a plasticizer, and a filler, preferably calcium carbonate. Specifically, the present invention is a sound-deadening composite having a good balance of heat performance and stiffness such that it is particularly suitable for sheet extrusion and subsequent thermoforming into sound-deadening sheets or carpet backings for use in vehicles.

BACKGROUND OF THE INVENTION

It has long been known that interposing mass between a sound source and the area to be kept quiet is an effective means for attaining sound deadening. A sheet of lead is thin, flexible, often highly effective, but costly. The challenge, then, is to attain dense, thin, flexible sheet which can be interposed between a source of noise and the area to be quieted.

Sheets of thermoplastics or of rubber-like materials have long been used as sound-deadening means. To make the sheets flexible, dense, strong, and inexpensive has posed a challenge to compounders for many years. For some uses, such as automobile carpet underlayment, it is desirable that the sound-deadening sheet is also formable.

Sound-deadening sheets made from composites of filled thermoplastic compositions are well known for use in such automotive applications. The thermoplastic compositions typically comprise one or more polymer, a filler, and optionally a plasticizer. A number of patents have been granted for such highly filled thermoplastic compositions as represented by U.S. Pat. Nos. 4,191,798; 4,222,924; 4,263,196; 4,379,190; 4,403,007; 4,430,468; 4,434,258; 4,438,228; 6,472,042; and 6,787,593. Different systems of polymers and fillers with and without plasticizers have been proposed. For example, the above-mentioned patents disclose the use of ethylene interpolymers such as ethylene/vinyl ester, ethylene/unsaturated mono- or di-carboxylic acids, esters of unsaturated acids, metallocene catalyzed ethylene-alpha olefin interpolymers, etc. Blends of such ethylene interpolymers with other elastomers and polymers have also been proposed.

Notwithstanding the proposal of many different polymer based compositions for use in sound-deadening composites, ethylene vinyl acetate has been widely used on a commercial basis. For sheet or flat applications, such materials demonstrate adequate modulus while meeting a number of balanced properties such as impact strength, tensile, elongation, flex modulus and specific gravity. However, where the sound-deadening composition or composite is used in certain applications, such as flooring applications, where formability is a key requirement, ethyl vinyl acetate based compositions lack sufficient heat performance and stiffness requirements. While some ethylene-alpha olefin based compositions or composites comprising plasticizers demonstrate adequate elasticity, and melt strength too allow thermoforming they do not meet more demanding heat performance and stiffness requirements. It would be desirable to have a composition or composite having both sufficient melt strength and elasticity such that sound-deadening applications with deep draws can be formed which further demonstrate improved heat performance and improved stiffness.

SUMMARY OF THE INVENTION

The filled thermoplastic polyolefin composition of the present invention is such a composition demonstrating good heat performance and stiffness capable of deep draws while providing excellent sound-deadening properties. The composition of the present invention is well suited for sheet extrusion and subsequent use in a thermoforming process to make thermoformed articles.

In one embodiment, the filled thermoplastic polyolefin composition of the present invention comprises
  (i) a propylene polymer, preferably a random propylene copolymer, having a density equal to or greater than 0.885 g/cm$^3$ in an amount of from 1 to 15 parts by weight, preferably of from 5 to 10 parts by weight;
  (ii) one or more linear ethylene polymer, one or more substantially linear ethylene polymer, or mixtures thereof, and preferably present in an amount of from 10 to 30 parts by weight, preferably of from 10 to 15 parts by weight characterized as having
    (ii.a) a density of less than about 0.873 g/cm$^3$ to 0.885 g/cm$^3$ and/or
    (ii.b) an $I_2$ of from greater than 1 g/10 min to less than 5 g/10 min;
  (iii) a filler, preferably calcium carbonate, barium sulfate, or mixtures thereof, and preferably present in an amount of from 60 to 80 parts by weight, preferably of from 65 to 80 parts by weight;
  (iv) a plasticizer preferably present in an amount of from 2 to 7 parts by weight, preferably of from 3 to 7 parts by weight,
and
  (v) optionally, optionally one or more of a slip agent, an ignition resistant additive, a stabilizer, a colorant, a pigment, an antioxidant, an antistat, a flow enhancer, a mold release, or a nucleating agent,
wherein parts by weight are based on the total weight of the filled thermoplastic polyolefin composition.

In another embodiment of the present invention, the hereinabove disclosed composition in the form of an extruded sheet.

In yet another embodiment, the present invention is process to make a thermoformed article comprising the steps of
  (A) extruding a sheet comprising the filled thermoplastic polyolefin composition disclosed hereinabove
  and
  (B) thermoforming said sheet into a thermoformed article, preferably a thermoformed under hood insulation, outer/inner dash insulation, upper/side cowl insulation, throw mats underlay, carpet underlay, floor damper, door insulation, header insulation, rear seat bottom/strainer, rear quarter/pillar trim, package tray, rear wheelhouse, trunk trim, trunk floor, or pressure sensitive damper.

DETAILED DESCRIPTION OF THE INVENTION

The filled thermoplastic polyolefin composition of the present invention comprises a propylene polymer as component (i). The propylene polymer suitable for use in this invention is well known in the literature and can be prepared by known techniques. In general, the propylene polymer is in the isotactic form, although other forms can also be used (e.g., syndiotactic or atactic). The propylene polymer used for the present invention is preferably a homopolymer of polypropylene or more preferably a copolymer, for example, a random or block copolymer, of propylene and an alpha-olefin, preferably a $C_2$ or $C_4$ to $C_{20}$ alpha-olefin. The alpha-olefin is present in the propylene copolymer of the present invention in an amount of not more than 20 percent by mole, preferably not more than 15 percent, even more preferably not more than 10 percent and most preferably not more than 5 percent by mole.

Examples of the $C_2$ and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

The propylene polymer of the present invention can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichloride which contains as essential components titanium, magnesium and a halogen; as an organometallic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Polypropylene is commonly made by catalytically reacting propylene in a polymerization reactor with appropriate molecular weight control agents. Nucleating agent is added after the reaction is completed in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in *Modern Plastics Encyclopedia*/89, mid October 1988 Issue, Volume 65, Number 11, pp. 86-92, the entire disclosure of which is incorporated herein by reference. The molecular weight of the propylene polymer for use in the present invention is conveniently indicated using a melt flow measurement, sometimes referred to as melt flow rate (MFR) or melt index (MI), according to ASTM D 1238 at 230° C. and an applied load of 2.16 kilogram (kg). Melt flow rate is inversely proportional to the molecular weight of the polymer. Thus, the higher the molecular weight, the lower the melt flow rate, although the relationship is not linear. The melt flow rate for the propylene polymer useful herein is generally greater than about 0.1 grams/10 minutes (g/10 min.), preferably greater than about 0.3 g/10 min., more preferably greater than about 0.5 g/10 min., and even more preferably greater than about 1 g/10 min. The melt flow rate for the propylene polymer useful herein is generally less than about 35 g/10 min., preferably less than about 20 g/10 min., more preferably less than about 10 g/10 min., and more preferably less than about 5 g/10 min.

The density of the propylene polymer used in the present invention is preferably equal to or greater than 0.885 grams per cubic centimeter ($g/cm^3$), more preferably equal to or greater than 0.890 $g/cm^3$, and most preferably equal to or greater than 0.900 $g/cm^3$.

In a preferred embodiment of the present invention, the propylene polymer is a random propylene copolymer.

In another embodiment, the propylene polymer of the present invention preferably has a density equal to or greater than 0.885 $g/cm^3$.

In another embodiment, the propylene polymer of the present invention has a MFR of from 1 to 5 g/10 min at 230° C. under a load of 2.16 kg.

Generally the propylene polymer is used in the filled thermoplastic polyolefin composition of the present invention in an amount equal to or greater than about 1 parts by weight, preferably equal to or greater than about 2 parts, more preferably equal to or greater than about 3 parts, and even more preferably equal to or greater than about 5 parts by weight based on the total weight of the filled thermoplastic polyolefin composition. Generally the propylene polymer is used in the filled thermoplastic polyolefin composition of the present invention in an amount equal to or less than about 15 parts by weight, preferably equal to or less than about 12 parts, more preferably equal to or less than about 10 parts, and even more preferably equal to or less than about 8 parts by weight based on the total weight of the filled thermoplastic polyolefin composition.

The filled thermoplastic polyolefin composition of the present invention further comprises an elastomeric component, component (ii). A preferred elastomeric component is one or more substantially linear ethylene polymer or one or more linear ethylene polymer (S/LEP), or mixtures thereof. Both substantially linear ethylene polymers and linear ethylene polymers are known. Substantially linear ethylene polymers and their method of preparation are fully described in U.S. Pat. Nos. 5,272,236 and 5,278,272. Linear ethylene polymers and their method of preparation are fully disclosed in U.S. Pat. Nos. 3,645,992; 4,937,299; 4,701,432; 4,937,301; 4,935,397; 5,055,438; EP 129,368; EP 260,999; and WO 90/07526.

Suitable S/LEP comprises one or more $C_2$ to $C_{20}$ alpha-olefins in polymerized form, having a $T_g$ less than 25° C., preferably less than 0° C., most preferably less than −25° C. Examples of the types of polymers from which the present S/LEP are selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

As used here, "a linear ethylene polymer" means a homopolymer of ethylene or a copolymer of ethylene and one or more alpha-olefin comonomers having a linear backbone (i.e. no cross linking), no long-chain branching, a narrow molecular weight distribution and, for alpha-olefin copolymers, a narrow composition distribution. Further, as used here, "a substantially linear ethylene polymer" means a homopolymer of ethylene or a copolymer of ethylene and of one or more alpha-olefin comonomers having a linear backbone, a specific and limited amount of long-chain branching, a narrow molecular weight distribution and, for alpha-olefin copolymers, a narrow composition distribution.

Short-chain branches in a linear copolymer arise from the pendent alkyl group resulting upon polymerization of intentionally added $C_3$ to $C_{20}$ alpha-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the substantially linear ethylene copolymers and the linear ethylene copolymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed by insitu generation of an oligomeric alpha-olefin via beta-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n–2") carbons, where n is the number of carbons of the largest alpha-olefin comonomer intentionally added to the reactor. Preferred long-chain branches in homopolymers of ethylene or copolymers of ethylene and one or more $C_3$ to $C_{20}$ alpha-olefin comonomers have at least from 20 carbons up to more preferably the number of carbons in the polymer backbone from which the branch is pendant. Long-chain branching may be distinguished using $^{13}C$ nuclear magnetic resonance spectroscopy alone, or with gel permeation chromatography-laser light scattering (GPC-LALS) or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

Preferred substantially linear ethylene polymers are prepared by using metallocene based catalysts capable of readily polymerizing high molecular weight alpha-olefin copolymers under the process conditions. As used here, copolymer means a polymer of two or more intentionally added comonomers, for example, such as might be prepared by polymerizing ethylene with at least one other $C_3$ to $C_{20}$ comonomer. Preferred linear ethylene polymers may be prepared in a similar manner using, for instance, metallocene or vanadium based catalyst under conditions that do not permit polymerization of monomers other than those intentionally added to the reactor. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one alpha-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$ to $C_{20}$ alpha-olefins, preferably copolymers of ethylene and one or more $C_3$ to $C_{10}$ alpha-olefin comonomers and more preferably copolymers of ethylene and one or more comonomers selected from the group consisting of propylene, 1-butene, 1-hexene, 4-methyl-1-pentane, and 1-octene. Most preferably the copolymers are ethylene and 1-octene copolymers.

The density of these substantially linear ethylene polymers or linear ethylene polymers is equal to or greater than about 0.850 grams per cubic centimeter ($g/cm^3$), preferably equal to or greater than about 0.860 $g/cm^3$, and more preferably equal to or greater than about 0.873 $g/cm^3$. Generally, the density of these substantially linear ethylene polymers or linear ethylene polymers is less than or equal to about 0.93 $g/cm^3$, preferably less than or equal to about 0.900 $g/cm^3$, and more preferably equal to or less than about 0.885 $g/cm^3$. The melt flow ratio for substantially linear ethylene polymers, measured as $I_{10}/I_2$, is greater than or equal to about 5.63, is preferably from about 6.5 to about 15, and is more preferably from about 7 to about 10. $I_2$ is measured according to ASTM Designation D 1238 using conditions of 190° C. and 2.16 kilogram (kg) mass. $I_{10}$ is measured according to ASTM Designation D 1238 using conditions of 190° C. and 10.0 kg mass.

The $M_w/M_n$ for substantially linear ethylene polymers is the weight average molecular weight ($M_w$) divided by number average molecular weight ($M_n$). $M_w$ and $M_n$ are measured by gel permeation chromatography (GPC). For substantially linear ethylene polymers, the $I_{10}/I_2$ ratio indicates the degree of long-chain branching, i.e. the larger the $I_{10}/I_2$ ratio, the more long-chain branching exists in the polymer. In preferred substantially linear ethylene polymers $M_w/M_n$ is related to $I_{10}/I_2$ by the equation: $M_w/M_n \leq (I_{10}/I_2)-4.63$. Generally, $M_w/M_n$ for substantially linear ethylene polymers is at least about 1.5 and preferably at least about 2.0 and is less than or equal to about 3.5, more preferably less than or equal to about 3.0. In a most preferred embodiment, substantially linear ethylene polymers are also characterized by a single DSC melting peak.

The preferred $I_2$ melt index for these substantially linear ethylene polymers or linear ethylene polymers is from about 0.01 g/10 min to about 100 g/10 min, more preferably about 0.1 g/10 min to about 10 g/10 min, and even more preferably about 1 g/10 min to about 5 g/10 min.

The preferred $M_w$ for these substantially linear ethylene polymers or linear ethylene polymers is equal to or less than about 180,000, preferably equal to or less than about 160,000, more preferably equal to or less than about 140,000 and most preferably equal to or less than about 120,000. The preferred $M_w$ for these substantially linear ethylene polymers or linear ethylene polymers is equal to or greater than about 40,000, preferably equal to or greater than about 50,000, more preferably equal to or greater than about 60,000, even more preferably equal to or greater than about 70,000, and most preferably equal to or greater than about 80,000.

The substantially linear ethylene polymer and/or linear ethylene polymer is employed in the filled thermoplastic polyolefin composition of the present invention in an amount equal to or greater than about 1 part by weight, preferably equal to or greater than about 3 parts by weight, more preferably equal to or greater than about 5 parts by weight based on the weight of the total composition. In general, the substantially linear ethylene polymer and/or linear ethylene polymer is used in amounts less than or equal to about 20 parts by weight, preferably less than or equal to about 15 parts by weight, more preferably less than or equal to about 10 parts by weight based on the weight of the total composition.

Component (iii) in the thermoplastic polyolefin composition of the present invention is one or more filler. Suitable fillers are calcium carbonate, barium sulfate, fly ash, talc, clay, mica, wollastonite, hollow glass beads, titaninum oxide, silica, carbon black, glass fiber, potassium titanate, cement dust, feldspar, nepheline, glass, fumed silica, alumina, magnesium oxide, zinc oxide, aluminum silicate, calcium silicate, titanium dioxide, titanates, glass microspheres, or chalk. Of these fillers, barium sulfate, talc, calcium carbonate, silica/glass, alumina and titanium dioxide, and mixtures thereof, are preferred; of these, calcium carbonate and barium sulfate are most preferred. See for example U.S. Pat. Nos. 6,472,042; 5,091,461; and 3,424,703 incorporated herein in their entirety and EP 639,613 A1 and EP 391,413, where these materials and their suitability as filler for polymeric resins are generally described. The fillers used in the present invention may or may not be coated, for example with a fatty acid.

Among other properties, the density of the filler(s) selected will influence the filler loading level to obtain optimized sound-deadening performance in the filled thermoplastic polyolefin compositions according to the present invention. Generally, the filler is employed in an amount of at least about 50 part by weight, preferably at least about 60 parts by weight, more preferably at least about 65 parts by weight, even more preferably at least about 70 parts by weight based on the total weight of the composition. Generally, an amount of filler up to and including about 90 parts by weight, preferably up to and including about 85 parts by weight, more preferably up to and including about 80 parts by weight, more preferably up to and including about 77 parts by weight based the total weight of the composition.

Component (iv) of the filled thermoplastic polyolefin composition of the present invention is a plasticizer. The plasticizer ingredient can be selected from one of several groups. The first group is the group known as processing oils. Three types of processing oils are known-paraffinic, aromatic, and naphthenic. None of these are pure; the grades identify the major oil-type present. Aromatic oils tend to "bleed" from the blends of the present invention. Bleeding is normally not desirable, but could be useful in specialty application, for example, in concrete forms where mold release characteristics are valued.

Naphthenic and paraffinic oils are non-bleeding in the formulations of the present invention when used in proper ratios and are this preferable for uses such as automotive carpet backing.

Processing oils are also subdivided by viscosity range. "Thin" oils can be as low as 100-500 Saybolt Universal Seconds (SUS) at 100° F. (38° C.). "Heavy" oils can be as high as 6000 SUS at 100° F. (38° C.). Processing oils, especially naphthenic and paraffinic oils with viscosity of from about 100 to 6000 SUS at 100° F. (38° C.) are preferred.

The second group of plasticizers that are effective, when used in the practice of the present invention, is the group comprising epoxidized oils such as epoxidized soybean oil and epoxidized linseed oil.

The third group of plasticizers that are effective, when used in the practice of the present invention, are polyester which, in general are liquid condensation products of a polybasic acid and a polyol. The term "liquid" in the context of the present invention is used to mean pourable at room temperature. The acid component is most often a saturated aliphatic dibasic acid, or an aromatic dibasic acid, adipic acid, azelaic acid, phthalic acid, sebacic acid, and glutaric acid, or mixtures of these acids are commonly used. The polyol can be an aliphatic polyol or a poly-oxyalkylene polyol, such as ethylene glycol, propylene glycol, 1,4- and 1,3-butane glycol, diethylene glycol, and polyethylene glycol. Preferred polyester compositions would consist of an acid component of which greater than 50 percent by weight are aliphatic polyol or even more preferably aliphatic glycol. Most preferred compositions are based on adipic or azelaic acid, and propylene glycol or the 1,3- or 1,4-butane glycol. The molecular weight of these plasticizers can vary from a low of a few hundred up to a high of about 10,000. The molecular weight of commercial products is seldom specified; however, typically in the trade, the molecular weight range of the product is classified as low, medium, or high. The preferred range for purposes of this invention is that classified as medium.

Mixtures of polyester or epoxidized oils with hydrocarbon oils are also effective plasticizers if and when used in the present invention. One objective of using such a mixture is to couple the high efficiency of the relatively high cost polyester or epoxidized oil with the low cost of the hydrocarbon oil. The cost/performance of a compound plasticized with such a mixture can be improved significantly for a given application because properties can be tailored more precisely, or filler levels can be increased. Actually certain advantages in the performance of the blends of the present invention are obtained as will be discussed below, when such a mixture is used as the plasticizer.

In general, both the epoxidized oils and the polyesters are more "efficient" than processing oils in plasticizing filled ethylene/alpha-olefin interpolymers; i.e., when used at the same weight percent, they produce blends that are more flexible and have higher percent elongation than the corresponding blends containing processing oil as the plasticizer.

Where a mixture of the polyester plasticizer and a hydrocarbon oil is employed, the relative proportions of the two components can be varied over a wide range depending upon performance objectives. Mixtures containing 50 percent or less of the polyester are preferred for economic reasons, and most preferred are those containing 20 percent or less if the polyester.

A fourth group of plasticizers, polyethers and polyether esters, are also effective plasticizers, if used in blends of the ethylene/alpha-olefin interpolymers and fillers of the present invention. In general, polyethers are oligomers or polymers of alkylene oxides, polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with an acid, fatty acids such as lauric and stearic acids are common examples of the compounds are the mono- and diesters of polyethylene or polypropylene glycol. The molecular weight of polyethers may range up to those typical of high polymers.

The plasticizer used in the filled thermoplastic polyolefin compositions of the present invention is present in an amount equal to or greater than about 3 parts by weight, preferably equal to or greater than about 3.5 parts, and more preferably equal to or greater than about 4 parts by weight based on the total weight of the filled thermoplastic polyolefin compositions. The plasticizer used in the filled thermoplastic polyolefin compositions of the present invention is present in an amount equal to or less than about 9 parts by weight, preferably equal to or less than about 7 parts, and more preferably equal to or less than about 6 parts by weight based on the total weight of the filled thermoplastic polyolefin compositions.

The claimed filled thermoplastic polyolefin compositions of the present invention may also optionally contain one or more additives that are commonly used in filled thermoplastic polyolefin compositions of this type. For example a slip agent, preferred slip agents are a saturated fatty acid amide or ethylenebis(amide), an unsaturated fatty acid amide or ethylenebis(amide) or combinations thereof. Other optional additives include, but are not limited to: ignition resistant additives, stabilizers, colorants, pigments, antioxidants, antistats, flow enhancers, mold releases, such as stearic acid, metal stearates (e.g., calcium stearate, magnesium stearate), nucleating agents, including clarifying agents, etc. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize polymer compositions against degradation caused by, but not limited to heat, light, and oxygen, or a mixture thereof may be used.

If used, such additives may be present in an amount from at least about 0.01 parts, preferably at least about 0.1 parts, more preferably at least about 0.5 parts, more preferably at least about 1 parts, more preferably at least about 2 parts and most preferably at least about 5 parts by weight based on the total weight of the composition. Generally, the additive is present in an amount less than or equal to about 25 parts, preferably less than or equal to about 20 parts, more preferably less than or equal to about 15 parts, more preferably less than or equal to about 12 parts, and most preferably less than or equal to about 10 parts by weight based on the total weight of composition.

Preparation of the filled thermoplastic polyolefin compositions of this invention can be accomplished by any suitable mixing means known in the art, including being prepared in a reactor, powder-powder blending, or preferably dry blending the individual components, and subsequently melt mixing (e.g., using a Banbury mixer, an extruder, roll mill, etc.). The melt blended filled thermoplastic polyolefin of the present invention may be first comminuted to pellets then subsequently extruded to prepare sheet or conveyed directly in a molten state to an extruder to prepare sheet.

The primary use for the compositions of the present invention will probably be in the sheeting area, specifically for use in thermoforming. The composition of the present invention is particularly suited for end uses requiring good stiffness. Preferably the thermoplastic polyolefin composition of the present invention has a 3-point bending modulus as determined by ASTM D747 equal to or greater than 130 MPa.

The process to extrude sheet is well know in the art. Extruded sheet is cut in preparation of the thermoforming process. Sheet dimensions (i.e., length, width, and thickness) and/or weight of the sheet will vary depending on the density of the filled thermoplastic polyolefin composition as well as the intended application which is specific to the thermoformed article to be made therefrom. Any sheet extrusion process which provides sheet with acceptable dimensions and/or weight is acceptable.

Sheet extrusion for the filled thermoplastic polyolefin composition of the present invention is preferably performed at a temperature equal to or less than 180° C., more preferably equal to or less than 160° C., more preferably equal to or less than 150° C., and most preferably equal to or less than 140° C. Sheet extrusion is preferably performed at a temperature equal to or greater than 120 C, more preferably equal to or greater than 125° C., and more preferably equal to or greater than 130 C. A preferred target temperature for sheet extrusion of the filled thermoplastic polyolefin composition of the present invention is 140° C.

Preferably, the cut extruded sheet comprising the filled thermoplastic polyolefin composition of the present invention is utilized in a thermoforming process to manufacture a thermoformed article. The process to thermoform a sheet into a formed article is well known. A sheet may be shaped into an article by positively thermoforming (sometimes referred to as "male" thermoforming) or negatively thermoforming (sometimes referred to as "female" thermoforming).

Thermoforming sheet comprising the filled thermoplastic polyolefin composition of the present invention is preferably performed at a temperature equal to or less than 145° C., more preferably equal to or less than 140° C., more preferably equal to or less than 135 C, and most preferably equal to or less than 130° C. Thermoforming sheet comprising the filled thermoplastic polyolefin composition of the present invention is preferably performed at a temperature equal to or greater than 90° C., more preferably equal to or greater than 95° C., and more preferably equal to or greater than 100° C. A preferred target temperature for thermoforming a sheet comprising the elastomer composition of the present invention is 110° C.

The filled thermoplastic polyolefin compositions of the present invention are useful as molded, especially thermoformed, in automotive articles which provide, among other properties, sound-deadening, dampening, insulation, and/or absorbance. For example, under hood insulation, outer/inner dash insulation, upper/side cowl insulation, throw mats underlay, carpet underlay, floor damper, door insulation, header insulation, rear seat bottom/strainer, rear quarter/pillar trim, package tray, rear wheelhouse, trunk trim, trunk floor, pressure sensitive damper, and the like.

We have identified three useful properties of a filled thermoplastic polyolefin composition which predict how well suited a particular filled thermoplastic polyolefin composition will be for both (1) extruding into sheet and (2) thermoforming said sheet into an article. The three properties are the composition's rheological properties (relative to how well/under what conditions it will extrude), its melt strength (relative to the sag properties of the sheet during the heating step of thermoforming), and its elongation (relative to the ability of the heated sheet to maintain its integrity when formed into articles having deep draws).

To illustrate the practice of this invention, examples of preferred embodiments are set forth below. However, these examples do not in any manner restrict the scope of this invention.

EXAMPLES

Comparative Examples A and B and Example 1 comprise a propylene polymer, an elastomer, a calcium carbonate, an oil component. Comparative Example C comprises a LDPE, an elastomer, a calcium carbonate, and an oil. All Comparative Examples and Examples further comprise stearic acid and a black color concentrate. Samples are compounded on commercial size equipment. The propylene polymer and/or LDPE, elastomer, CaCO₃, oil, stearic acid, and carbon black color concentrate are dry blended and continuously feed to a Farrel Continuous Mixer (FCM). The mixer is run at 370 rpm with a dump orifice size large enough to allow the material to mix long enough to have all polymers melted and powders dispersed and still run at a rate where the extruder is not starve fed.

The molten material is conveyed to a single screw extruder running at 24 rpm which is temperature controlled at approximately 150° C. The material is extruded through a die and then a calendar roll which has a chiller with a set point of 39° F. The calendar roll presses the material into a finished sheet of a density approximately 1.0 lb/ft² which resulted in a sheet, after trimming, measuring about 72.5 inches by about 40.5 inches by about 0.12 inches. The sheet thickness is dependent upon the filler loading and therefore the density of the material being made into sheet. For example, if the filler level goes up, the density goes up, and the resulting sheet will be thinner to maintain the 1 lb/ft² for the appropriate specification.

The resulting sheet is thermoformed into a dash mat. The temperature of the sheet for thermoforming is controlled in an oven where the power output of the elements and the amount of time in the oven are the variables controlled. The sheet is heated the oven to a point, in this application, from 90° C., at the leading edge of the sheet as it exits the oven, to 130° C., the trailing edge of the sheet. The oven is run at 80 percent power for 32 seconds and the sheet is flexible enough to sag when lifted, moved, and stretched slightly over the tooling, but not so much that the material continues to stretch and tear before it is draped over the tooling.

A robot with suction cups moves to the sheet and lifts it off the oven conveyor and moves the sheet over the tooling. The material is stretched and lowered onto the tool. The robot assists with holding the material to the tool until the vacuum is applied and the material is held to the tool pneumatically until the deepest draw section is completed. The vacuum is not throttled back as the part forms so the vacuum pressure increases as the number of ports are blocked off during the thermoforming process. After the part is formed it is removed from the tool.

The compositions for Comparative Examples A, B, and C and Example 1 are given in Table 1 below in parts by weight based on the weight of the total composition. In Table 1:

"PP-1" is high rubber extrusion grade propylene polymer with a density of 0.880 g/cm³, a MFR of 0.6 g/10 min determined at 230° C. under a load of 2.16 kg, having an ISO flexural modulus of 80 MPa available as HIFAX™ CA10A from LyondellBasell;

"PP-2" is a random propylene copolymer having a density of 0.9 g/cm³, a MFR of 1.9 g/10 min determined at 230° C. under a load of 2.16 kg, having an ASTM flexural modulus of 1020 MPa available as Polypropylene RA131-02A from The Dow Chemical Company;

"SLEP" is a substantially linear ethylene-octene copolymer having a density of 0.875 g/cm³ and a MFR of 3 g/10 min at 190° C. under a load of 2.16 kg available as ENGAGE™ 8452 Polyolefin Elastomer from The Dow Chemical Company;

"LDPE" is a low density polyethylene with a density of 0.921 g/cm3, and a MFR of 0.22 g/10 min at 190° C. under a load of 2.16 kg available as LDPE 132I from The Dow Chemical Company;

"CaCO₃" is an uncoated calcium carbonate available from Carmeuse Natural Chemicals wherein at least 90 percent of the particles are equal to or less than 5 microns in size;

"Oil" is a paraffinic oil available as HYPRENE™ P150BS from Ergon-West Virginia, Inc. having a viscosity at 40° C. according to ASTM D 341 of 471 centistokes (cSt) and a specific gravity at 15.6° C. of 0.894;

"Stearic acid" is available as Stearic Acid 70% VEG-FGK from ACME Hardesty; and

"Black" color concentrate is available as POLYBLACK™ 46515F from A. Schulman.

Properties for Comparative Examples A, B, and C and Example 1 are determined according to the following tests. Results are listed in Table 1:

"Bending Modulus" is 3 point apparent bending modulus determined according to ASTM D747;

"Tensile" is tensile strength and is determined according to ASTM D412;

"Elongation" is tensile elongation at break and is determined according to ASTM D412;

"Stiffness" is an in-house test wherein at least five (5) thermoformed articles are stacked and shipped if they are not crushed and/or distorted in any manner, they pass the test, however is they are crushed and/or distorted in any manner, they fail the test; and "Heat Performance" is a BMW protocol wherein a 180 mm by 50 mm sample of the thermoformed article is suspended above 18 mm of foam insulation held in fixture, separated by an air gap from a hot plate at 180° C. and heated for 300 continuous hours. If the sample does not melt, pool, separate, blister, embrittle, or deform in any manner it passes the test, if it melt, pool, separates, blisters, embrittles, or deforms in any manner, it fails the test.

TABLE 1

|  | Comparative Example | | | Example |
|---|---|---|---|---|
|  | A* | B* | C* | 1 |
| COMPONENT | | | | |
| PP-1 | 7.39 | 12.43 | | |
| LDPE | | | 6 | |
| PP-2 | | | | 6 |
| SLEP | 10.21 | 8.9 | 11.6 | 11.6 |
| CaCO₃ | 76.59 | 73.1 | 76.59 | 76.59 |
| Oil | 5.11 | 4.75 | 5.11 | 5.11 |
| Stearic Acid | 0.51 | 0.54 | 0.51 | 0.51 |
| Black | 0.19 | 0.28 | 0.19 | 0.19 |
| PROPERTIES | | | | |
| Bending Modulus, MPa | 68 | 33 | 49 | 155 |
| Tensile, psi | | | 330 | 414 |
| Elongation, % | | | 665 | 542 |
| Heat Performance | Pass | Failed | Failed | Pass |
| Stiffness | Failed | Failed | Failed | Pass |

*not an example of the present invention

The invention claimed is:

1. A filled thermoplastic polyolefin composition consisting of:
   (i) from about 1 to about 15 parts by weight of a propylene polymer having a density equal to or greater than 0.885 g/cm³, wherein the propylene polymer is a copolymer consisting of propylene and ethylene;
   (ii) from about 10 to about 30 parts by weight of one or more linear ethylene polymer, one or more substantially linear ethylene polymer, or mixtures thereof characterized as having (ii.a) a density equal to or greater than 0.873 g/cc and equal to or less than 0.885 g/cc and
(ii.b) an $I_2$ of from greater than 1 g/10 min to less than 5 g/10 min;
wherein the linear ethylene polymer is prepared by using a metallocene or vanadium based catalyst and the substantially linear ethylene polymer is prepared by using a metallocene based catalyst;
(iii) from about 2 to about 7 parts by weight of plasticizer;
(iv) from about 60 to about 85 parts by weight of particulate filler;
and
(v) optionally one or more of a slip agent, an ignition resistant additive, a stabilizer, a colorant, a pigment, an antioxidant, an antistat, a flow enhancer, a mold release, or a nucleating agent;
wherein parts by weight is based on the total weight of the thermoplastic polyolefin composite.

2. The filled thermoplastic polyolefin composition of claim 1 wherein
(i) the propylene polymer is present in an amount of from 5 to 10 parts by weight;
(ii) the one or more linear ethylene polymer, one or more substantially linear ethylene polymer, or mixtures thereof are present in an amount of from 10 to 15 parts by weight;
(iii) the filler is present in an amount of from 65 to 80 parts by weight;
and
(iv) the plasticizer is present in an amount of from 3 to 7 parts by weight, wherein parts by weight are based on the total weight of the filled thermoplastic polyolefin composition.

3. The composition of claim 1 wherein the propylene polymer is a random propylene copolymer.

4. The composition of claim 1 wherein the filler is calcium carbonate, barium sulfate, or mixtures thereof.

5. The composition of claim 1 in the form of an extruded sheet.

6. The composition of claim 1 in the form of thermoformed article.

7. The composition of claim 1 in the form of thermoformed under hood insulation, outer/inner dash insulation, upper/side cowl insulation, throw mats underlay, carpet underlay, floor damper, door insulation, header insulation, rear seat bottom/strainer, rear quarter/pillar trim, package tray, rear wheelhouse, trunk trim, trunk floor, or pressure sensitive damper.

8. A process to make a thermoformed article comprising the steps of
(A) extruding a sheet comprising a filled thermoplastic polyolefin composition consisting of
(i) from 1 to 15 parts by weight of a random propylene copolymer consisting of propylene and ethylene;
(ii) from 10 to 30 parts by weight of one or more linear ethylene polymer, one or more substantially linear ethylene polymer, or mixtures thereof characterized as having
(ii.a) a density equal to or greater than 0.873 g/cc and equal to or less than 0.885 g/cc and
(ii.b) an $I_2$ of from greater than 1 g/10 min to less than 5 g/10 min
wherein the linear ethylene polymer is prepared by using a metallocene or vanadium based catalyst and the substantially linear ethylene polymer is prepared by using a metallocene based catalyst;
(iii) from 60 to 80 parts by weight of a filler;
(iv) from 3 to 7 parts by weight of a plasticizer;
and
(v) optionally one or more of a slip agent, an ignition resistant additive, a stabilizer, a colorant, a pigment, an antioxidant, an antistat, a flow enhancer, a mold release, or a nucleating agent, wherein parts by weight are based on the total weight of the filled thermoplastic polyolefin composition
and
(B) thermoforming said sheet into a thermoformed article.

* * * * *